United States Patent [19]

Hatfield

[11] Patent Number: 4,742,737

[45] Date of Patent: May 10, 1988

[54] MULTIPLE STROKE RATCHET HAND TOOL

[75] Inventor: John G. Hatfield, Camp Hill, Pa.

[73] Assignee: AMP Incorporated, Harrisburg, Pa.

[21] Appl. No.: 871,235

[22] Filed: Jun. 6, 1986

[51] Int. Cl.⁴ .............................................. B25B 7/12
[52] U.S. Cl. ......................................... 81/355; 81/357
[58] Field of Search ................. 81/357, 356, 355, 314, 81/347, 352, 353, 354; 72/410; 30/189, 193, 245, 258, 135; 140/93 A, 93.2, 93.4

[56] References Cited

U.S. PATENT DOCUMENTS

| | | | |
|---|---|---|---|
| 1,454,917 | 5/1923 | Barrett | 30/249 |
| 2,861,488 | 11/1958 | Barnes . | |
| 2,861,489 | 11/1958 | Barnes . . | |
| 2,861,490 | 11/1958 | Rozmus . | |
| 3,101,017 | 8/1963 | Malkin et al. . | |
| 3,210,844 | 10/1965 | Tontscheff | 81/358 |
| 3,324,702 | 6/1967 | Malkin . | |
| 3,342,059 | 9/1967 | Laux . | |
| 3,359,779 | 12/1967 | Filia | 72/412 |
| 3,922,783 | 12/1975 | Hayes | 30/250 |
| 4,080,820 | 3/1978 | Allen | 81/355 X |
| 4,178,682 | 12/1979 | Sadauskas | 30/250 |
| 4,185,519 | 3/1980 | Hays et al. | 74/577 S |
| 4,221,048 | 9/1980 | Parramore | 30/135 |

FOREIGN PATENT DOCUMENTS

| | | |
|---|---|---|
| 0058375 | 9/1982 | Fed. Rep. of Germany . |
| 1162295 | 9/1958 | France . |
| 1276554 | 12/1960 | France . |
| 2025825 | 5/1979 | United Kingdom . |
| 2060462 | 10/1979 | United Kingdom . |

OTHER PUBLICATIONS

V. 653, Machinery 103 (1963.11.13), 2661,1091.
IBM Technical Disclosure Bulletin; vol. 13, No. 11, Apr. 1971.

Primary Examiner—Frederick R. Schmidt
Assistant Examiner—Maurina Rachuba
Attorney, Agent, or Firm—Bruce J. Wolstoncroft

[57] ABSTRACT

A multiple stroke hand tool comprises a ram slidably mounted to a support member. A compact rotatable ratchet member is connected to the ram and pivotally mounted to the support member such that as a drive pawl engages the ratchet member, it is rotated causing the ram to move between an open position and a closed position. A resilient member is attached to the ratchet member and exerts a force on the ratchet member opposing rotation thereof. A latching means, pivotally mounted to the support member, cooperates with the ratchet member to prevent unwanted backward rotation of the ratchet member. The latching means disengages from the ratchet member at the end of a cycle which in turn causes the drive pawl to disengage from the ratchet member, allowing automatic return of the ram to the open position. A manual override is also provided such that the latching means may be disengaged as required. A fast take-up is also positioned on the hand tool such that quick, easy, one-handed operation is effected.

30 Claims, 6 Drawing Sheets

MULTIPLE STROKE RATCHET HAND TOOL

FIELD OF THE INVENTION

This invention relates to a hand tool and more particularly to a multiple stroke hand tool that can be easily operated with one hand while still generating the required force to perform heavy duty operations (i.e., crimping, cutting, etc.).

BACKGROUND OF THE INVENTION

A wide variety of hand grip tools are known in the industry. Many of these tools are designed to do a specific operation while others are designed to do many operations through the use of changeable mating die halves. Such hand tools are generally either double action hand tools (DAHT) which have dies that close in an arc-like path or straight action hand tools (SAHT) which have straight line die movement.

A great many of these hand tools are of the type having a single stroke operation, i.e. having cooperating work members which are moved from a fully open position to a fully closed position during a single stroke of the handles. This type of arrangement does not provide much mechanical advantage, and consequently heavy duty tasks are difficult to perform. In an effort to make these tools easier to operate, the handles may be lengthened in order to increase the mechanical advantage of the tools. However, the lengthening of the handles creates a large handle span, preventing one hand operation and also eliminating the usefulness of the tools in a confined area.

In an attempt to provide some relief of the above problems multiple stroke hand tools have been developed which provide greater mechanical advantage than the single stroke tools. The mechanical advantage is provided through the use of a ratchet member driven by the movement of the handles as they are displaced toward each other. This mechanical advantage allows the handle of the hand tool to be positioned such that maximum grip strength of the operator corresponds with the maximum input force required for operation. As the diameter of the ratchet member is increased, the forces exerted on the drive means is decreased, allowing for a longer lasting hand tool. However, as the diameter of the ratchet member is increased, the overall dimensions of the tool must be increased resulting in a large, impractical tool. Another design feature of many of these multiple stroke hand tools is that no manual release means is provided. In other words, once the hand tool has begun to perform its operation, the operation must be completed, giving the operator no opportunity to manually override the hand tool. Consequently, if the operation is being performed improperly, the operator can do nothing to prevent it, resulting in wasted material and wasted effort. The few multiple stroke hand tools that have a manual release require that the manual release be engaged even when the operation has been completed; no automatic return is provided. This added step requires more time and effort to complete the operation.

SUMMARY OF THE INVENTION

An object of the present invention is to provide a compact multiple stroke hand tool with a specially designed ratchet member, such that the compact hand tool may provide a greater mechanical advantage, thus reducing the handle forces, than that presently available in a hand tool of similar size.

Another object of the invention is to provide a multiple stroke hand tool having a release mechanism allowing a manual return of the tool to the first position if the need arises or an automatic return of the tool to the first position after the operation has been completed.

Another object of the present invention is to provide a multiple stroke hand tool having a fast take-up means which is positioned to allow for easy one-hand operation.

The hand tool is comprised of a support member. A ram is slidably mounted to the support member such that the ram may be moved between an open position and a closed position. A rotatable ratchet member is pivotally mounted to the support member and is connected to the ram, such that as a drive pawl engages the ratchet member, the ratchet member is rotated between a first position and a second position and the ram is linearly moved between the open position and the closed position. The tool is characterized in that a resilient member is attached to the ratchet member at one end and to the support member at the other end. As the ratchet member is rotated the resilient member expands, causing a resilient force to oppose the rotation of the ratchet member. A latching member is pivotally mounted to the support member, a pawl portion of which engages the ratchet member. Consequently, once rotation of the ratchet member has begun, the contact portion prevents the resilient force from returning the ratchet member to the first position.

A contacting surface is provided on the ratchet member for engagement with the latching member, to disengage the latching member from the ratchet member when the second position has been reached. Locking means is provided proximate the latching member; the locking means cooperates with the latching member to keep the pawl portion disengaged from the ratchet member as the resilient force returns the ratchet member to the first position. A means is also provided to disengage the drive pawl from the ratchet member as the ratchet member returns to the first position.

The return of the ratchet member to the first position requires the ram to return to the open position. As the ram reaches the open position, the ram engages the locking means causing the pawl portion to re-engage the ratchet member.

DETAILED DESCRIPTION OF THE INVENTION

A hand tool 2 of the present invention is designed to allow interchangeable mating die halves to be used such that cutting, crimping, swagging, gripping, etc. may be performed on a wire by hand tool 2 according to the mating die halves chosen to be used. For simplification, crimping die halves will be used in the description of hand tool 2. However, as mentioned, hand tool 2 is not limited to these die halves.

Figure 1:
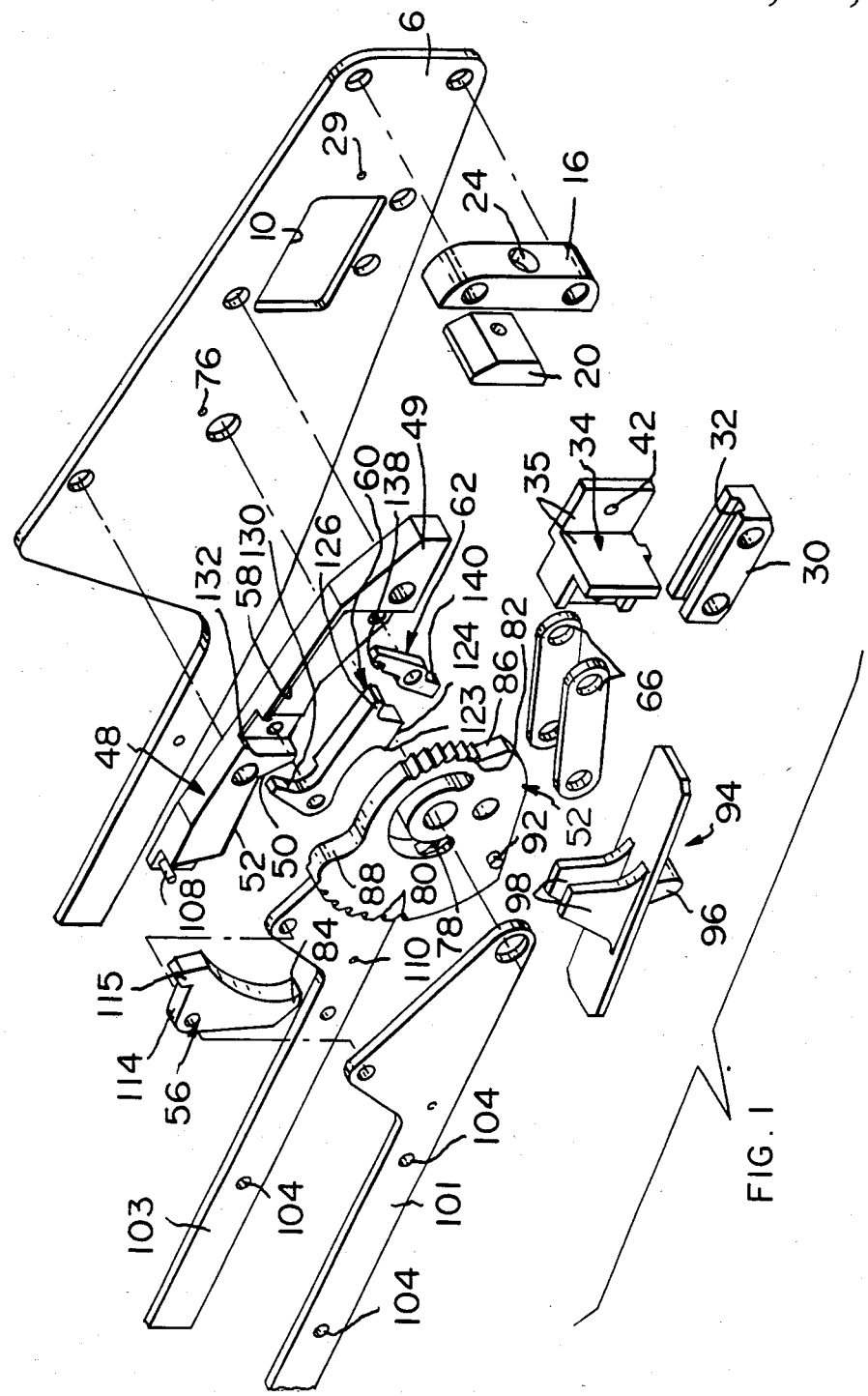
FIG. 1 is an exploded perspective view of the component parts of a hand tool of the present invention.

Tool 2 comprises a front plate 4 and a rear plate 6 defining a support frame as shown in FIG. 1. Front plate 4 has an opening 8, while back plate 6 has a smaller opening 10. When plates 4, 6 are positioned in place, openings 8, 10 are aligned such that they cooperate with changeable mated die members 12, 14 shown in FIGS. 3 through 5.

An end support 16 is positioned at a top of plates 4, 6 and secured thereto by securing members 18. End support 16 spaces plates 4, 6 in their proper positions as well as securing block 20 in position at a top of opening 8 through the use of a screw 22 inserted through hole 24 of support 16.

The positioning of block 20 at the top of opening 8 in plate 4 allows die member 12 to be inserted in engagement with block 20 through opening 8 and secured in position by a pin 26 inserted through a hole 28 of die member 12 into a corresponding hole 29 of back plate 6.

Figure 3:
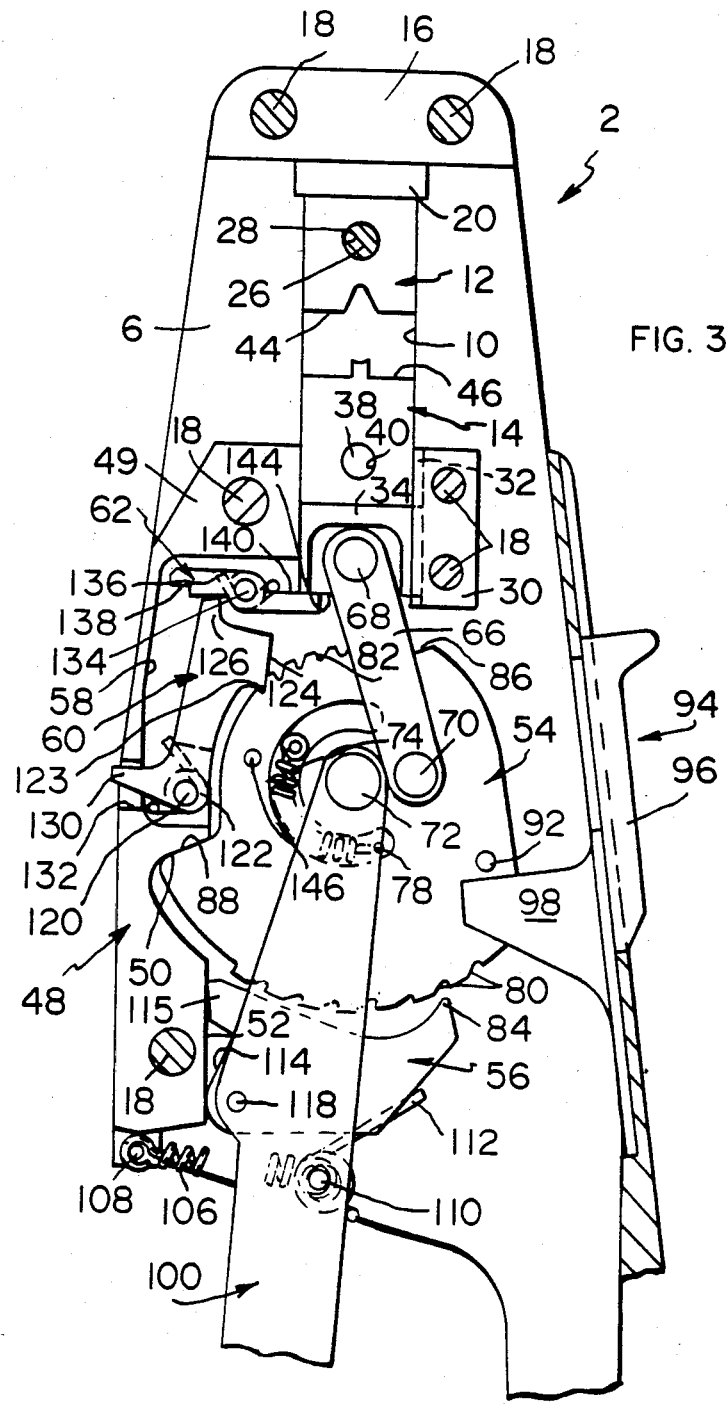
FIG. 3 is a side elevational view of the hand tool with the front plate and cover plate removed showing the mechanism in an open position.
Figure 5:
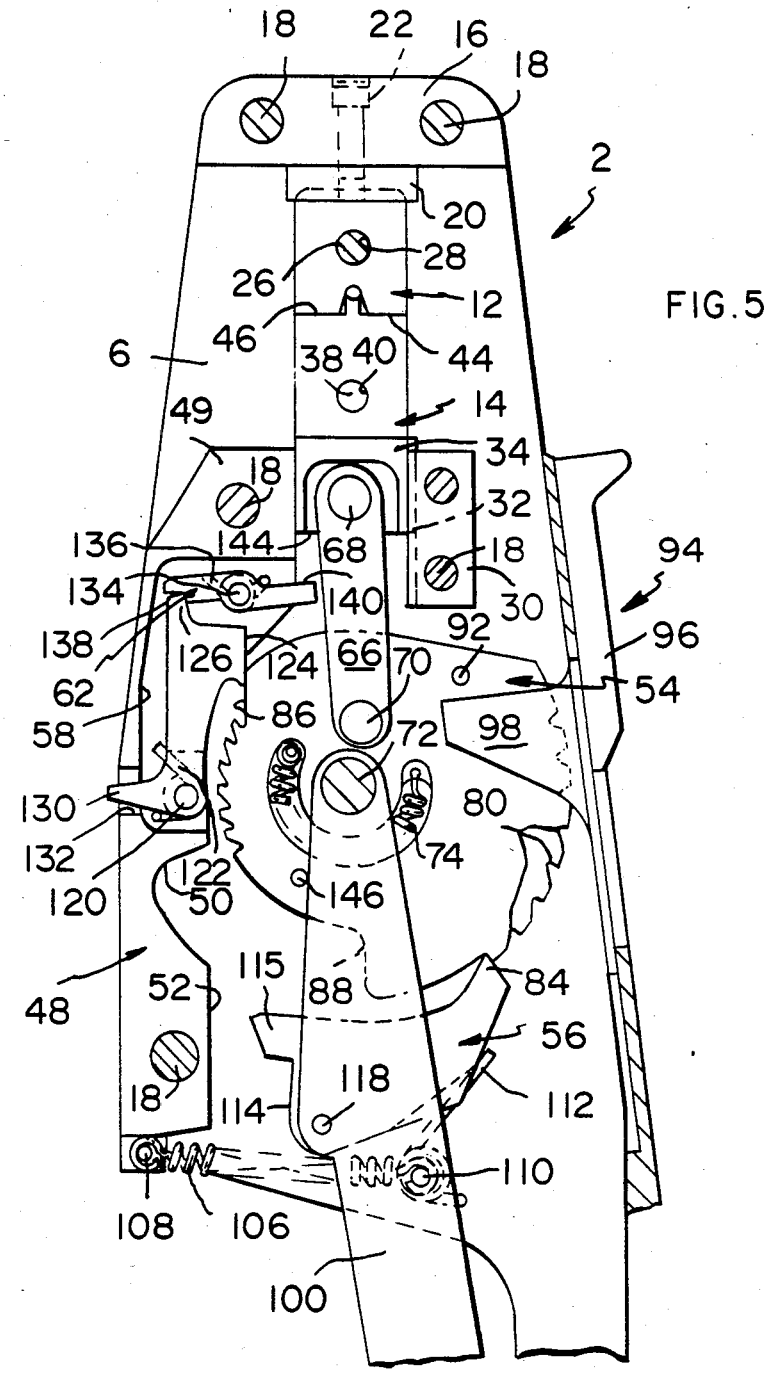
FIG. 5 is a side elevational view similar to FIG. 4 showing the mechanism of the hand tool in a closed position.

A block 30 is positioned proximate a bottom of opening 8 of plate 4 and is secured to plates 4, 6 by securing members 18. A groove 32, as best shown in FIG. 1, is provided on the inside of block 30, groove 32 cooperating with a ram 34 to allow ram 34 to slidably move therealong. Ram 34 is aligned with opening 8 such that mating die member 14 may be mounted onto support section 35 of ram 34 and secured thereon by pin 38 inserted through opening 40 of die member 14 into hole 42 of ram 34. As shown in FIG. 3, block 20 and ram 34 are positioned proximate the top and bottom of opening 8 when tool 2 is in an open position. With members 12, 14 in position and a terminal and a wire positioned between die members 12, 14, ram 34 and die 14 are slidably moved to a closed position, as shown in FIG. 5. In this position, a bottom surface 44 of die 12 engages a top surface 46 of die 14, causing die members 12, 14 to cooperate with each other to crimp the terminal to the wire.

An upper section 49 of a pawl carrier 48 is provided adjacent opening 8, opposite block 30. Upper section 49 cooperates with block 30 to maintain ram 34 in place. Carrier 48 extends away from opening 8, along plate 6 to provide stop surfaces 50, 52 for a ratchet member 54 and drive pawl 56, as will be discussed. A cavity 58 is provided in carrier 48 in which latching pawl 60 and latch 62 are mounted. A plate (not shown) covers cavity 58 thereby securing pawl 60 and latch 62 in cavity 58. Carrier 48 is secured to plates 4, 6 by securing members 18.

Links 66 are pivotally connected at pivots 68, 70 to ram 34 and ratchet member 54 respectively, as shown in FIG. 3. This configuration allows links 66 to transfer a rotary motion of ratchet member 54 into a linear motion of ram 34, allowing die members 12, 14 to be brought together such that the force required to crimp the terminal is applied equally across the terminal and the wire. Therefore, hand tool 2 is a straight action hand tool.

Figure 4:
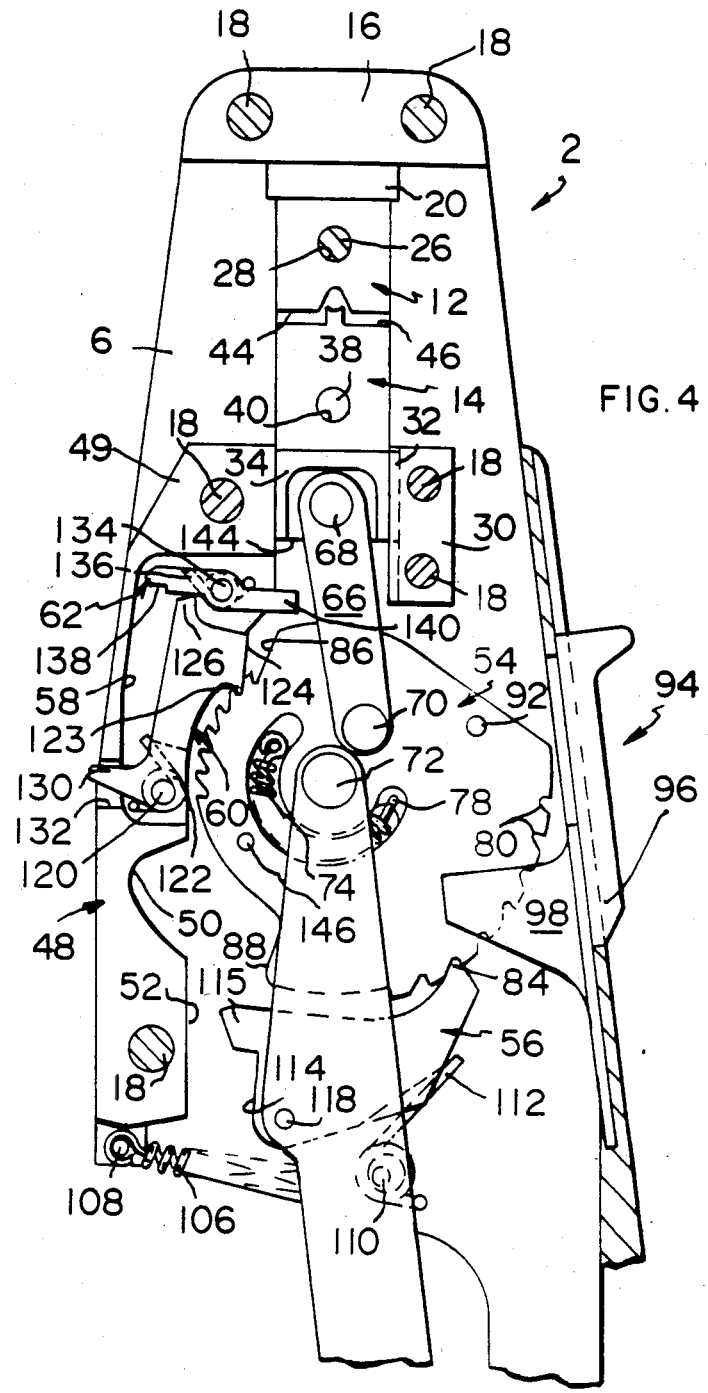
FIG. 4 is a side elevational view similar to FIG. 3 showing the mechanism of the hand tool in an intermediate position.

Ratchet member 54 is provided to move link 66 as discussed above. To this end, ratchet member 54 is rotatably mounted to plates 4, 6 at a pivot 72. A coil spring 74, as shown in FIGS. 3 through 5, is provided proximate pivot 72 and is connected at one end at opening 76 to plate 6 and at the other end at opening 78 to ratchet member 54. Spring 74 is at rest when ram 34 is in the open position. As ratchet member 54 is rotated, spring 74 exerts a spring force on ratchet member 54, as will be discussed.

The design of ratchet member 54 utilizes minimal space while ensuring a reliable, effective means of operation. In order to do this, ratchet member 54 is provided with drive teeth 80 positioned a distance $R1$ from pivot 72 and latching teeth 82 positioned a distance $R2$ from pivot 72, such that $R1 > R2$. As $R1$ is increased, less force is required from projection 84 of drive pawl 56 to drive ratchet member 54 in order to generate the force necessary to crimp the terminal to the wire. The distance $R1$ is therefore critical to prevent generation of large forces on teeth 80 and projection 84 which will result in a failure thereof. Teeth 82 are positioned a shorter distance $R2$ away from pivot 72 because teeth 82 merely act to hold member 54 in place and therefore teeth 82 do not have the large forces associated with them. The distances $R1$ and $R2$ are designed such that the forces applied will not result in a failure of the tool. However, $R1$ and $R2$ are also designed so that ratchet member 54 occupies less space which results in a reliable compact hand tool that has a long useful life.

A release surface 86 is provided on member 54 adjacent teeth 82, and a stop surface 88 is provided on member 54 between teeth 80 and 82 opposite surface 86. Surface 86 cooperates with latching pawl 60 and surface 88 cooperates with stop surface 50 of carrier 48 as will be discussed.

A pin 92 is provided on ratchet member 54 to cooperate with a fast take-up 94. A portion 96 of take-up 94 is positioned outside plates 4, 6 such that portion 96 may be moved manually upward. As portion 96 is moved upward, legs 98 of take-up 94 engage pin 92 of ratchet member 54 forcing ratchet member 54 to rotate, which in turn causes ram 34 and die member 14 to move toward block 20 and die member 12. This type of action is only effective to place die members 12, 14 into engagement with the terminal. To perform the actual process of crimping, more force is required than can be generated through this process.

Figure 2:
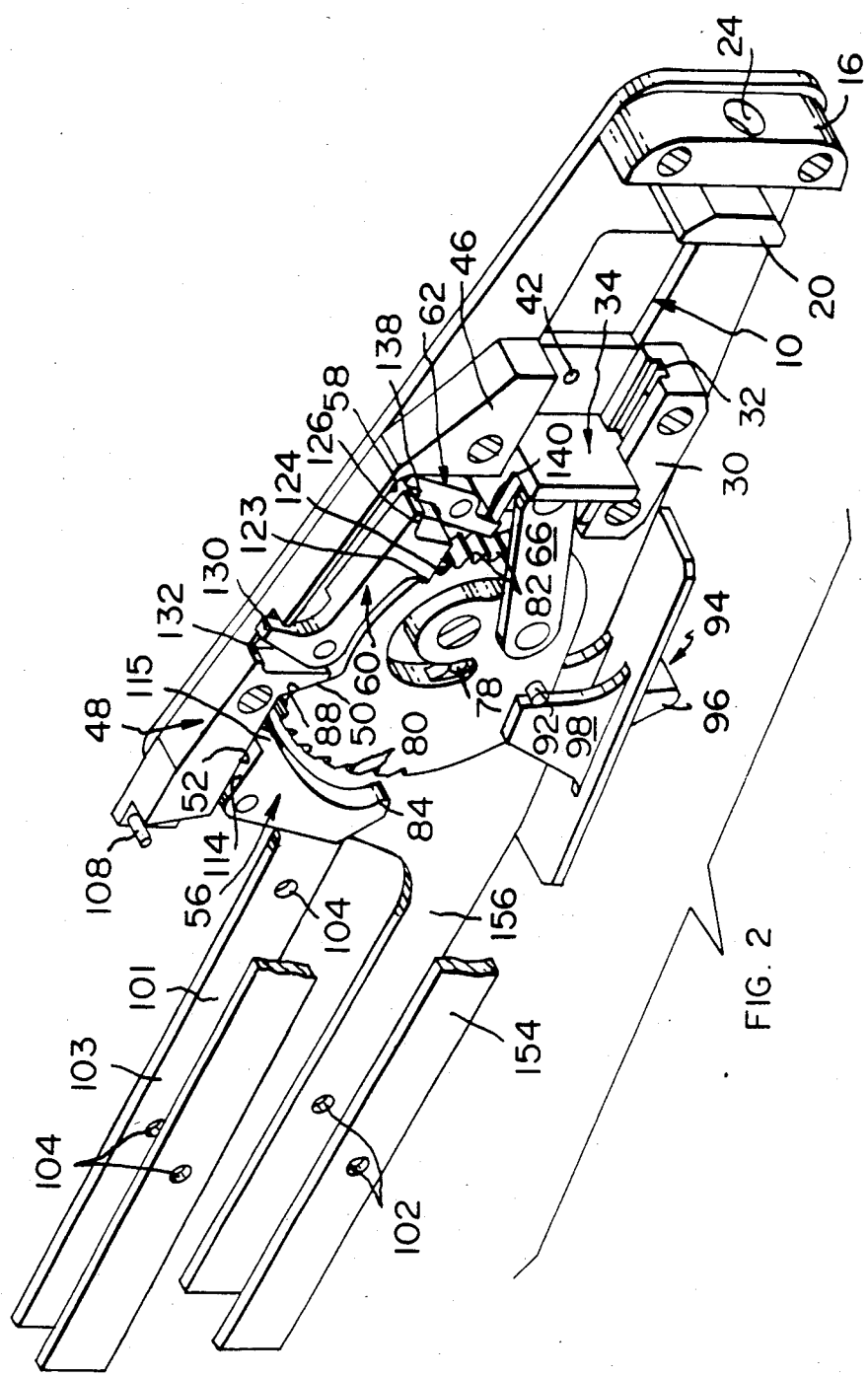
FIG. 2 is a perspective view similar to FIG. 1 showing the hand tool in an assembled condition with a front plate and cover plate removed.

To generate the required force necessary to crimp the wire, a movable handle 100 having identical plates 101, 103 cooperates with ratchet member 54 to generate the required mechanical advantage. Handle 100 is pivotally mounted at one end between plates 4, 6 at pivot 72 and serves principally as a drive lever. Openings 102, 104 are provided on plates 4, 6 and handle 100 (FIGS. 1 and 2) to secure hard plastic covers 150, 152 to plates 4, 6 and handle 100 of the tool enabling the operator to better grip hand tool 2, allowing for easier operation of the hand tool. Drive pawl 56 is pivotally mounted to handle 100 via pin 118 and is positioned to act in the well-known manner of such pawl devices upon ratchet member 54.

Handle 100 is biased away from handle sections 154, 156 of support plates 4, 6 through the use of spring 106 attached at one end to projection 108 of carrier 48 and the other end to handle 100 at opening 110. Pawl 56 is biased toward ratchet member 54 through the use of spring 112 mounted on handle 100 at pin 118, allowing projection 84 of pawl 56 to cooperate with teeth 80 to drive ratchet member 54, as will be discussed. However, when handle 100 is not displaced, as shown in FIG. 3, an end surface 115 of drive pawl 56 engages surface 52 of carrier 48 causing pawl 56 to pivot about pin 118 thereby resulting in pawl 56 being positioned out of engagement with member 54. Point 84 is therefore disengaged from teeth 80 when handle 100 is in this position.

Latching pawl 60 is pivotally mounted on carrier 48 by pin 120. Spring 122 is mounted on pin 120 in engagement with pawl 60 urging pawl 60 toward member 54. A point 123 of pawl 60 is engageable with teeth 82 of ratchet member 54 to prevent backward rotation of member 54, as will be discussed. An engagement surface 124 and a projection 126 are provided on pawl 60 for cooperation with ratchet member 54 and latch 62 respectively. A release portion 130 of pawl 60 extends through an opening 132 of carrier 48 to allow manual release of pawl 60 from member 54.

Latch 62 is pivotally mounted on carrier 48 via pin 134. Spring 136 is mounted on pin 134 in engagement with latch 62 urging latch 62 toward pawl 60. A recess 138 is provided at one end of latch 62 and a contact surface 140 is provided at the other end.

In operation, hand tool 2 is used for crimping the terminal to the wire. Mating die members 12, 14 are secured to block 20 and ram 34 respectively. The terminal and wire are then inserted through openings 8, 10 of plates 4, 6 such that the terminal and wire are positioned between mating die members 12, 14. The fast take-up 94 is manually operated in the manner discussed above, placing both die members 12, 14 in engagement with the terminal. As this occurs, projection point 123 of latching pawl 60 engages teeth 82 preventing ratchet member 54 from backward rotation, such that ram 34 is maintained in engagement with the terminal when the fast take-up procedure is complete.

To proceed further, handle 100 is displaced toward the handle sections of plates 4, 6. In so doing, spring 112 urges drive pawl 56 to engage teeth 80 of member 54. As handle 100 is further displaced, ratchet member 54, in engagement with drive pawl 56, is forced to move accordingly. Handle 100 reaches a maximum displacement and is then released whereupon spring 106 moves handle 100 to its original position. Consequently, pawl 56, attached to handle 100, also returns toward its original position. The shape of teeth 80 are such that pawl 56 can return with handle 100 while exerting only a minimal force on teeth 80. However, pawl 56 does not return to its original position until surface 115 of pawl 56 engages surface 52 of carrier 48 causing pawl 56 to disengage from member 54 and return to its original position, as shown in FIG. 3.

As handle 100 is released, ratchet member 54 is prevented from returning to its original position because teeth 82 of ratchet member 54 are engaged by point 123 of latching pawl 60 to prevent ratchet member 54 from returning to its original position. The orientation of teeth 82 allows point 123 to remain in constant engagement with teeth 82, except as discussed below. This orientation allows ratchet member 54 to rotate in the proper direction while point 123 exerts a very minimal force on teeth 82.

The process of displacing handle 100 toward the handle sections 154, 156 of plates 4, 6 is repeated such that pawl 56 engages teeth 80 each time handle 100 is depressed, causing ratchet member 54 to rotate thereby forcing links 66 to move which in turn drives ram 34 and die member 14 toward die member 12. Each displacement of handle 100 moves die member 14 a step closer to die member 12. An example is shown in FIG. 4, depicting tool 2 just before die members 12, 14 are completely closed.

FIG. 5 shows tool 2 in a completely closed position before handle 100 is released. As can be seen, surfaces 44, 46 of die members 12, 14 are in engagement. Links 66 have stopped approximately ten degrees from vertical thereby preventing links 66 from reaching a vertical orientation which reduces the amount of force required to return member 54 to its original position. Consequently, spring 74 is not required to generate a large force thereby enabling spring 74 to have a longer useful life. In FIG. 5, pawl 56 is in engagement with a last tooth of teeth 80 causing engagement of surface 86 of member 54 with surface 124 of pawl 60 which forces pawl 60 to be released from ratchet member 54. Projection 126 of pawl 60 engages recess 138 of latch 62 thereby maintaining pawl 60 out of engagement with member 54.

As handle 100 is released from the position shown in FIG. 5, spring 106 returns handle 100 to its original position and pawl 56 returns therewith, and ratchet member 54 returns simultaneously with handle 100 until projection 115 of drive pawl 56 contacts surface 52 of carrier 48. This causes pawl 56 to pivot about pin 118 until end surface 114 contacts surface 52 which prevents pawl 56 and handle 100 from moving past their original position. As pawl 56 pivots about pin 118, projection 84 disengages from teeth 80 allowing ratchet member 54 to continue to rotate back under the influence of spring 74 until surface 88 of ratchet member 54 contacts surface 50 of carrier 48.

As ratchet member 54 returns, links 66 return ram 34 to the open position, shown in FIG. 3. At the end of this return action, simultaneous with surface 88 of member 54 contacting surface 50 of carrier 48, a bottom surface 144 of ram 34 contacts surface 140 of latch 62, causing latch 62 to pivot about pin 134, such that recess 138 is moved away from projection 126 to pawl 60, allowing pawl 60 to return to its original position with projection 123 in engagement with ratchet member 54. All parts of tool 2 are now in their original positions, ready to repeat the process of crimping another terminal to a wire.

If it becomes necessary during the operation of hand tool 2 to return die member 14 to an open position (i.e., improper insertion of the terminal), release portion 130 of pawl 60 may be contacted by the operator thereby pivoting pawl 60 about pin 120, placing projection 126 in engagement with recess 138 and allowing the same return procedure as described above to occur.

In order to ensure that handle 100 is proximate sections 154, 156 of plates 4, 6 when ram 34 reaches the closed position, pin 146 may be provided on ratchet member 54, as shown in FIGS. 3 through 5. As ratchet member 54 is rotated, pin 146 moves with member 54 so that as ram 34 nears the closed position, pin 146 engages an upper section of handle 100 thereby preventing spring 106 from returning handle 100 to its original position. Consequently, pin 146 forces handle 100 to be near sections 154, 156 of plates 4, 6 when the closed position of die members 12, 14 is reached, as shown in FIG. 5. This is an important option of hand tool 2 which helps to reduce some problems present in hand tools. The maximum amount of input forced required by the operator is when the closed position is reached. Thus, when maximum force is required, handle 100 is proximate sections 154, 156, allowing the operator to generate the required force with a nearly closed hand. This is an ideal situation because the operator can generate more force under less stress with a closed hand than if the operator's hand were in an open or stretched position.

Figures 6, 7:
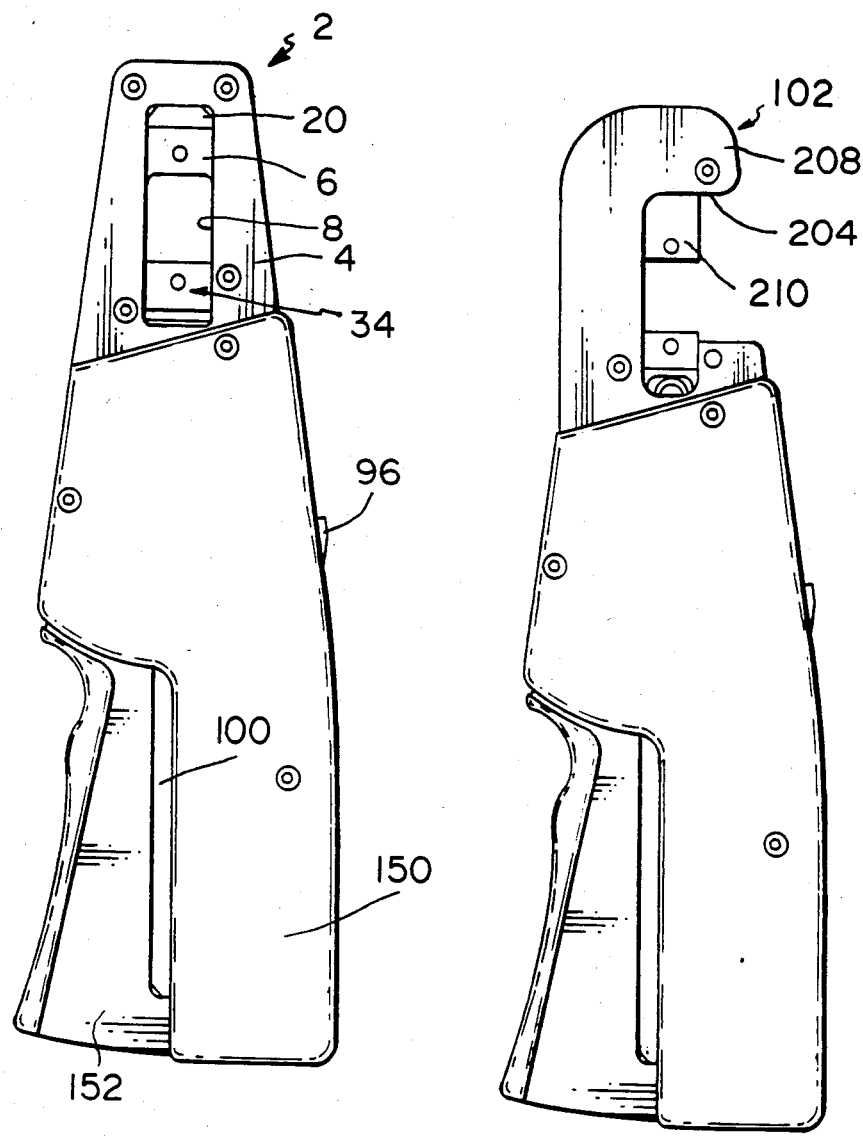
FIG. 6 is a side view showing the exterior of the tool.
FIG. 7 is a side view showing the exterior of an alternative embodiment of the tool.

An alternative embodiment is shown in FIG. 7. Tool 202 operates in the same manner as tool 2 described above. However, openings 204, 206 extend to a side of plates 208, 210. This allows insertion of a wire and terminal from the side which may be required in some situations. All other parts are identical to tool 2.

This hand tool requires the operator to manually produce only a small force to perform the required operation. However, through the use of a special ratchet member, the size of the hand tool remains compact and easily used in confined areas. The latching pawl and latch allow the operator to manually return the tool to the first position as required or to finish the operation and have the tool automatically return to the first position. One-hand operation is essentially assured.

I claim:

1. A hand tool comprising:
   support plates;
   a ram slidably mounted to the support plates such that the ram is moved between an open position and a closed position;
   a ratchet member pivotally mounted to the support plates, the ratchet member being moved between a first position and a second position corresponding to the open and closed position of the ram;
   means for moving the ratchet member;
   a resilient means attached to the ratchet member at one end and to one of the support plates at the other end such that as the ratchet member is moved, the resilient means is deformed thereby exerting pressure on the ratchet member to return the ratchet member to the first position;
   means 66 connecting the ram to the ratchet member so that as the ratchet member is moved, the ram slides from the open position to the closed position;
   latching means mounted on the support plates and having a contact portion for engagement with the ratchet member, thereby preventing the resilient means from causing unwanted backward movement of the ratchet member;
   a contacting surface provided on the ratchet member such that when the ratchet member reaches the second position, the contacting surface will engage a surface of the latching means, thereby forcing the contact portion of the latching means to disengage from the ratchet member permitting the resilient means to return the ratchet member to the first position; and
   a projection attached to the latching means, the projection extending outward from the support plates, such that upon manual engagement of the projection, the contact portion of the latching means is disengaged from the ratchet member, thereby permitting the resilient means to return the ratchet member to the first position.

2. A hand tool as recited in claim 1 wherein an outside edge of the ratchet member has drive teeth on one side and latching teeth on the other side, the drive teeth being spaced from the center of the ratchet member a greater distance than the latching teeth.

3. A hand tool as recited in claim 2 wherein an stop surface is provided on the outside edge of the ratchet member between the latching teeth and the drive teeth, the stop surface cooperates with a corresponding surface of a carrier to stop the ratchet member in the first position when the latching means is released from the ratchet member.

4. A hand tool as recited in claim 3 wherein the contacting surface of the ratchet member is positioned between the latching teeth and the drive teeth on the outside edge of the ratchet member on the opposite side from the engagement surface.

5. A hand tool as recited in claim 4 wherein the means for connecting the ratchet member to the ram are links which are pivotally connected to the ratchet member at one end and pivotally connected to the ram at the other end such that as the ratchet is rotated, the ram is slidably moved in a straight line.

6. A hand tool as recited in claim 5 wherein openings are provided in the support plates and a block is positioned proximate tops of the openings.

7. A hand tool as recited in claim 6 wherein the ram and the block are designed to secure mating die members thereon such that as the ram moves, the die members cooperate to perform their respective operations.

8. A hand tool as recited in claim 7 wherein the ratchet member has projections extending therefrom which cooperate with a fast take-up slide, such that as the fast take-up is moved, the ratchet member is rotated causing the ram to be moved into a position in which the die members contact a terminal and hold it in place.

9. A hand tool as recited in claim 4 wherein handle sections extend from the support plates.

10. A hand tool as recited in claim 9 wherein the means for moving the ratchet member comprises a drive pawl pivotally connected to a movable handle which is in turn pivotally mounted to the support plates, such that as the movable handle is displaced toward the handle sections of the support plates, the drive pawl engages the drive teeth of the ratchet member, causing the ratchet member to rotate.

11. A hand tool as recited in claim 10 wherein a drive pawl contact surface is provided to cooperate with the drive pawl such that as the ratchet member returns to the first position, the drive pawl contacts the drive pawl contact surface causing the drive pawl to disengage from the ratchet member.

12. A hand tool as recited in claim 1 wherein the latching means comprises a latching pawl and a latch, the latching pawl having the contact portion, the surface 124 which cooperates with the contacting surface of the ratchet member, and the projection located thereon.

13. A hand tool as recited in claim 12 wherein the latch cooperates with the latching pawl, such that as the surface of the latching pawl is contacted by the contacting surface of the ratchet member, the latch engages a portion of the latching pawl, preventing the contact portion of the latching pawl from engaging the ratchet member until the ratchet member is returned to the first position, at which time the latch releases the latching pawl, allowing the contact portion of the latching pawl to re-engage the ratchet member.

14. A hand tool as recited in claim 13 wherein the ram contacts the latch as the ram is returned from the closed position to the open position, thereby causing the latch to release the latching pawl, allowing the contact portion of the latching pawl to re-engage the ratchet member.

15. A tool, comprising:
frame means having first and second means mounted thereon for movement toward and away from each other between an open position and a closed position;
movable means mounted on said frame means for movement between a first position and a second position, the movable means having first and second teeth means provided thereon, the first teeth means being spaced from the center of the movable means a different distance than the second teeth means;
return means between said frame means and said movable means for maintaining said movable means in the first position and returning said movable means to said first position when said movable means reaches said second position;
connection means positioned between said movable means and said second means such that as the movable means is moved between the first and second sections, the second means will be moved between the open and closed positions;
operating means operatively connected to said first teeth means of the movable means for moving said movable means between the first and second positions; and
latching means for engagement with said second teeth means of the movable means during movement of said movable means, the latching means provided to maintain said movable means at different positions between the first and second positions.

16. A tool as recited in claim 15 whereby a release means is provided to cooperate with the return means, such that the movable means may be manually returned to the first position.

17. A tool as recited in claim 16 whereby a contact means is provided to cooperate with the release means to automatically return the movable means to the first position when the movable means reaches the second position.

18. A tool as recited in claim 15 whereby a fast take-up means is provided to cooperate with the movable means to quickly place the second means in an operational position.

19. A hand tool comprising support plates, a ram slidably mounted to the support plates such that the ram may be moved between an open position and a closed position, a ratchet member pivotally mounted to the support plates and a means connecting the ram to the ratchet member such that as the ratchet member is moved between a first position and a second position, the ram is moved between the open position and the closed position, the tool being characterized in that:
an outside edge of the ratchet member has drive teeth on one side and latching teeth on the other side, the drive teeth being spaced from the center of the ratchet member a greater distance than the latching teeth;
a return member is attached to the ratchet member at one end and to one of the support plates at the other end, such that as the ratchet member is moved, the return member expands causing a force to oppose the rotation of the ratchet member,
latching means mounted to the support plates and having a contact portion for engagement with the ratchet member, so that once rotation of the ratchet member has begun, the contact portion prevents the force exerted by the return member from returning the ratchet member to the first position,
a contacting surface is provided on the ratchet member for engagement with a surface of the latching means, the surfaces being cooperable to disengage the contact portion of the latching means from the ratchet member when the second position has been reached,
locking means provided proximate the latching means, the locking means cooperating with the latching means to keep the contact portion of the latching means disengaged from the ratchet member as the force, exerted by the return member, returns the ratchet member to the first position,
whereby the return of the ratchet member to the first position requires the ram to return to the open position, such that as the ram approaches the open position, the ram engages a portion of the locking means, causing the locking means to disengage the latching means thereby allowing the contact portion of the latching means to re-engage the ratchet member.

20. A hand tool as recited in claim 19 characterized in that a stop surface is provided on the outside edge of the ratchet member between the latching teeth and the drive teeth, the stop surface cooperates with a corresponding surface of a carrier to stop the ratchet member in the first position when the latching means is released from the ratchet member.

21. A hand tool as recited in claim 20 characterized in that the contacting surface of the ratchet member is positioned between the latching teeth and the drive teeth on the outside edge of the ratchet member on the opposite side from the stop surface.

22. A hand tool as recited in claim 21 characterized in that support handle sections of a support handle extend from the support plates.

23. A hand tool as recited in claim 22 characterized in that means for rotating the ratchet member comprises a drive pawl pivotally connected to a movable handle which is in turn pivotally mounted to the support plates, such that as the movable handle is displaced toward the handle sections of the support handle, the drive pawl engages the drive teeth of the ratchet member, causing the ratchet member to rotate.

24. A hand tool as recited in claim 23 characterized in that a drive pawl contact surface is provided to cooperate with the drive pawl whereby as the ratchet member returns to the first position, the drive pawl contacts the drive pawl contact surface causing the drive pawl to disengage from the ratchet member.

25. A hand tool as recited in claim 21 characterized in that means for connecting the ratchet member to the ram are links which are pivotally connected to surfaces of the ratchet member at one end and pivotally connected to the ram at the other end such that as the ratchet member is moved in a circular motion, the ram is slidably moved in a straight line.

26. A hand tool as recited in claim 25 characterized in that an opening is provided in each support plate, the ram slides between a bottom of the opening and a block positioned proximate a top of the opening.

27. A hand tool as recited in claim 26 characterized in that the ram and the block are configured to secure mating die members therein such that as the ram moves, the die members cooperate to perform their respective operations.

28. A hand tool as recited in claim 27 characterized in that the ratchet member has a projection extending therefrom, the projections cooperate with a fast take-up slide to rotate the ratchet member which in turn slides the ram into a position in which the die halves contact a terminal and hold it in place.

29. A hand tool as recited in claim 19 characterized in that the locking means cooperates with the latching means, such that as the latching means is engaged by the contacting surface of the ratchet member, the locking means engages a portion of the latching means, preventing the contact portion of the latching means from engaging the ratchet member, until the ratchet member is returned to the first position, at which time the locking means releases the latching means, allowing the contact portion of the latching means to engage the ratchet member.

30. A hand tool as recited in claim 29 wherein the ram contacts the locking means as the ram is returned from the open position to the closed position, causing the latching means to release the latching means.

* * * * *